United States Patent
Sprenger

(10) Patent No.: US 12,174,359 B2
(45) Date of Patent: Dec. 24, 2024

(54) APOCHROMATIC MICROSCOPE OBJECTIVE AND MICROSCOPE

(71) Applicant: Carl Zeiss CMP GmbH, Göttingen (DE)

(72) Inventor: Jörg Sprenger, Göttingen (DE)

(73) Assignee: Carl Zeiss CMP GmbH, Göttingen (DE)

(*) Notice: Subject to any disclaimer, the term of this patent is extended or adjusted under 35 U.S.C. 154(b) by 503 days.

(21) Appl. No.: 17/550,567

(22) Filed: Dec. 14, 2021

(65) Prior Publication Data
US 2022/0187585 A1 Jun. 16, 2022

(30) Foreign Application Priority Data

Dec. 16, 2020 (DE) .......................... 102020216081.3

(51) Int. Cl.
*G02B 21/02* (2006.01)
*G02B 9/12* (2006.01)
*G02B 13/00* (2006.01)

(52) U.S. Cl.
CPC .............. *G02B 21/02* (2013.01); *G02B 9/12* (2013.01); *G02B 13/006* (2013.01)

(58) Field of Classification Search
None
See application file for complete search history.

(56) References Cited

U.S. PATENT DOCUMENTS

| 729,391 A | 3/1998 | Ito | |
|---|---|---|---|
| 978,147 A | 11/1999 | Kudo | |
| 2013/0100537 A1* | 4/2013 | Matthae | G02B 21/02 359/656 |
| 2013/0148202 A1* | 6/2013 | Yoshida | G02B 21/02 359/558 |
| 2013/0271847 A1* | 10/2013 | Shi | G02B 21/33 359/656 |

FOREIGN PATENT DOCUMENTS

| DE | 10 2017 218 169 B3 | 3/2019 |
|---|---|---|
| EP | 3 557 302 A1 | 10/2019 |

OTHER PUBLICATIONS

German Search Report, with translation thereof, for corresponding DE Appl No. 10 2020 216 091.3, dated Aug. 16, 2021.

* cited by examiner

*Primary Examiner* — Robert E. Tallman
(74) *Attorney, Agent, or Firm* — Fish & Richardson P.C.

(57) ABSTRACT

Apochromatic microscope objective (1) with a focal length f'(Obj), comprising a front lens (L1) made of a high refractive index material, a second lens (L2) which is arranged adjacent to the front lens and which has a thickness (d2) at least as great as a thickness (d1) of the front lens (L1), d2≥d1, and at least one cemented group (Gi), wherein the last cemented group (G1) in the beam path of the microscope objective (1) has a converging cemented surface (FK) with a cemented radius (rK) ranging from −0.95 f'(Obj) to −0.75 f'(Obj).

21 Claims, 3 Drawing Sheets

APOCHROMATIC MICROSCOPE OBJECTIVE AND MICROSCOPE

CROSS-REFERENCE TO RELATED APPLICATIONS

This application claims benefit under 35 U.S.C. § 119 to German Application No. 10 2020 216 081.3, filed Dec. 16, 2020. The contents of this application is hereby incorporated by reference in its entirety The invention relates to an apochromatic microscope objective. Moreover, the invention relates to a microscope having such an objective.

Apochromatic microscope objectives are known from the prior art.

By way of example, apochromatic microscope objectives are known from U.S. Pat. No. 5,729,391, DE 10 2017 218 169B3 and EP 3 557 302 A1.

Image aberrations become visible in the edge region of large object fields, particularly in the case of high numerical apertures.

It is an object of the invention to improve an apochromatic microscope objective. In particular, it is an object of the invention to improve an apochromatic microscope objective for large object fields.

This object is achieved by an objective comprising a front lens made of a high refractive index material, a second lens which is arranged adjacent to the front lens and which has a thickness at least as great as the thickness of the front lens, and at least one cemented group, wherein the last cemented group in the beam path of the microscope objective has a converging cemented surface (FK) with a cemented radius (rK) ranging from −0.95 to −0.75 times the focal length of the objective.

It was recognized that the growth of higher-order image aberrations can be reduced using a high refractive index front lens.

In this case, a high refractive index material is understood to mean, in particular, a material with a refractive index $n_e$ of at least 1.7 at a wavelength of 546 nm.

In this case, a converging cemented surface should be understood to mean a surface which is located between two materials with refractive index $n_1$, $n_2$ and which satisfies the following condition: $(n_2-n_1)/rK>0$, where $r_K$ specifies the radius of curvature of the cemented surface.

High-resolution imaging of large object fields is rendered possible by way of the objective according to the invention. This is especially advantageous when using sensors with a large sensor area, that is to say a large image field.

In particular, the optical design of the objective can be such that even higher-order aberrations, in particular the so-called trefoil aberration, are reduced.

In particular, the second lens (L2) has a thickness (d2) which is greater than the thickness (d1) of the front lens (L1) by at least 10%, in particular by at least 20%. In particular, the second lens (22) can have a thickness (d2) which is greater than the thickness (d1) of the front lens (21) by no more than 50%:$d2≤1.5d1$. In particular, the following applies:$d2≤1.43d1$.

This leads to simpler manufacturability of the objective.

According to one aspect of the invention, the front lens (L1) is made of a material with a refractive index $n_e≥1.8$. In particular, from the lenses of the objective, it can be the lens with the highest refractive index.

According to a further aspect of the invention, the microscope objective has three cemented groups (Gi, i=1 to 3).

It was found that a particularly well-corrected objective design can be attained therewith.

According to an aspect of the invention, the objective has at least two cemented groups (Gi; i=1 . . . n with n≥2), wherein the second to last cemented group (Gn−1) comprises a diverging lens (Lz) with a high optical power in order to reduce the Petzval curvature of the objective.

According to a further aspect of the invention, the objective can have a cemented triplet. This was found to be advantageous for correcting a broad wavelength spectrum in particular.

According to a further aspect of the invention, the front lens (L1) can be the second thickest lens of the objective.

It was found that it is advantageous, in particular for correcting the higher-order image aberrations, if the two front-most lenses of the objective are its thickest lenses. In conjunction with the high refractive index front lens, this can reduce the occurrence of higher-order aberrations in the front region and thereby avoid the inducing effect thereof.

According to a further aspect of the invention, the second to last lens of the objective can have a thinner embodiment than the front lens (L1). A thinner embodiment of the second to last lens is advantageous for the transmission of the objective.

According to a further aspect of the invention, the total number n of lenses (Li; i=1 . . . n) is no more than ten. In particular, the total number n of lenses (Li) can be nine or ten.

A smaller number of lenses leads to more cost-effective manufacturability of the objective.

According to a further aspect of the invention, a single lens can be arranged between the first cemented group (G1) and the second cemented group (G2).

The single lens can serve to pull together the ray bundle in the objective. This makes it easier to correct the field curvature.

According to a further aspect of the invention, no further lenses are arranged between the last two cemented groups (Gi) of the objective.

Fewer lenses lead to a lower manufacturing outlay.

According to a further aspect of the invention, the last two cemented groups (G2, G3) have surfaces (FLi, FLi+1) that face one another, with the following applying to their radii of curvature: $|r(FLi+1)|≥|r(FLi)|$. Expressed differently, in terms of absolute value, the radius of curvature of that surface (FLi+1) of the objective that faces the second to last cemented group of the objective is at least as large as the radius of curvature of that surface of the second to last cemented group that faces the last cemented group.

While that surface of the second to last cemented group that faces the last cemented group generally has a positive radius of curvature, that is to say the centre of curvature is downstream of the corresponding lens in the beam direction, that surface of the last cemented group that faces the second to last cemented group generally has a negative radius of curvature. However, this is not mandatory. In particular, the radius of curvature of that surface of the last cemented group that faces the second to last cemented group can also be infinite.

In particular, the following can apply: $r(FLi+1)/-r(FLi)>1.35$, in particular $r(FLi+1)/-r(FLi)>1.4$, where once again FLi+1 denotes that surface of the last cemented group that faces the second to last cemented group and FLi denotes that surface of the second to last cemented group that faces the last cemented group.

According to a further aspect of the invention, the objective has a numerical aperture (NA) of at least 0.7. In particular, the numerical aperture of the objective can range between 0.75 and 0.85. In particular, it can be 0.75 or 0.8. This facilitates a high resolution.

According to a further aspect of the invention, the objective has a working distance of at least 1 mm.

It was found that the objective design according to the invention facilitates the use of the objective with different tube lens systems for intermediate image generation. In particular, the objective according to the invention can be used with an achromatic tube system or with a tube lens system designed for compensation purposes. This is shown below on the basis of different exemplary embodiments.

The objective design according to the invention facilitates a compromise between the demands for a large object field with the highest possible aperture and the accompanying great optical and economic outlay, particularly for the aperture range of NA=0.75 to 0.85 and a working distance AA≥1 mm.

The design according to the invention allows the objective to be embodied without vignetting. As a result, great homogeneity can be attained in respect of resolution and illumination.

In particular, with the aid of the objective design according to the invention it is possible to also correct higher-order aberrations, especially what is called the trefoil aberration, well.

According to an aspect of the invention, the objective is designed such that even off-axis object points supply a rotationally symmetric point image (computationally the point spread function—abbreviated to PSF) as a consequence of even suppressing higher-order aberrations. As a criterion for the rotational symmetry of the point images, the following relationship applies to an object field radius $R_{Obj}$: $R_{Obj}/f_{Obj} \leq 3°$ The objectives according to the invention facilitate imaging of large object fields with large apertures and hence a high resolution. Consequently, they are advantageous, in particular, for the case of large image fields as rendered possible by large-area sensors. Especially the vignetting-free embodiment of the objective facilitates particularly homogeneous illumination and resolution up into the edge regions of the field.

By way of the objective design according to the invention it is possible to achieve a very good apochromatic correction on the optical axis and also over the entire image field.

A further object of the invention is to improve a microscope. This object is achieved by means of a microscope with an objective according to the description above.

The advantages are evident from those of the objective.

Further details and advantages of the invention will become apparent from the description of a plurality of exemplary embodiments with reference to the figures. In the figures.

Figure 1:
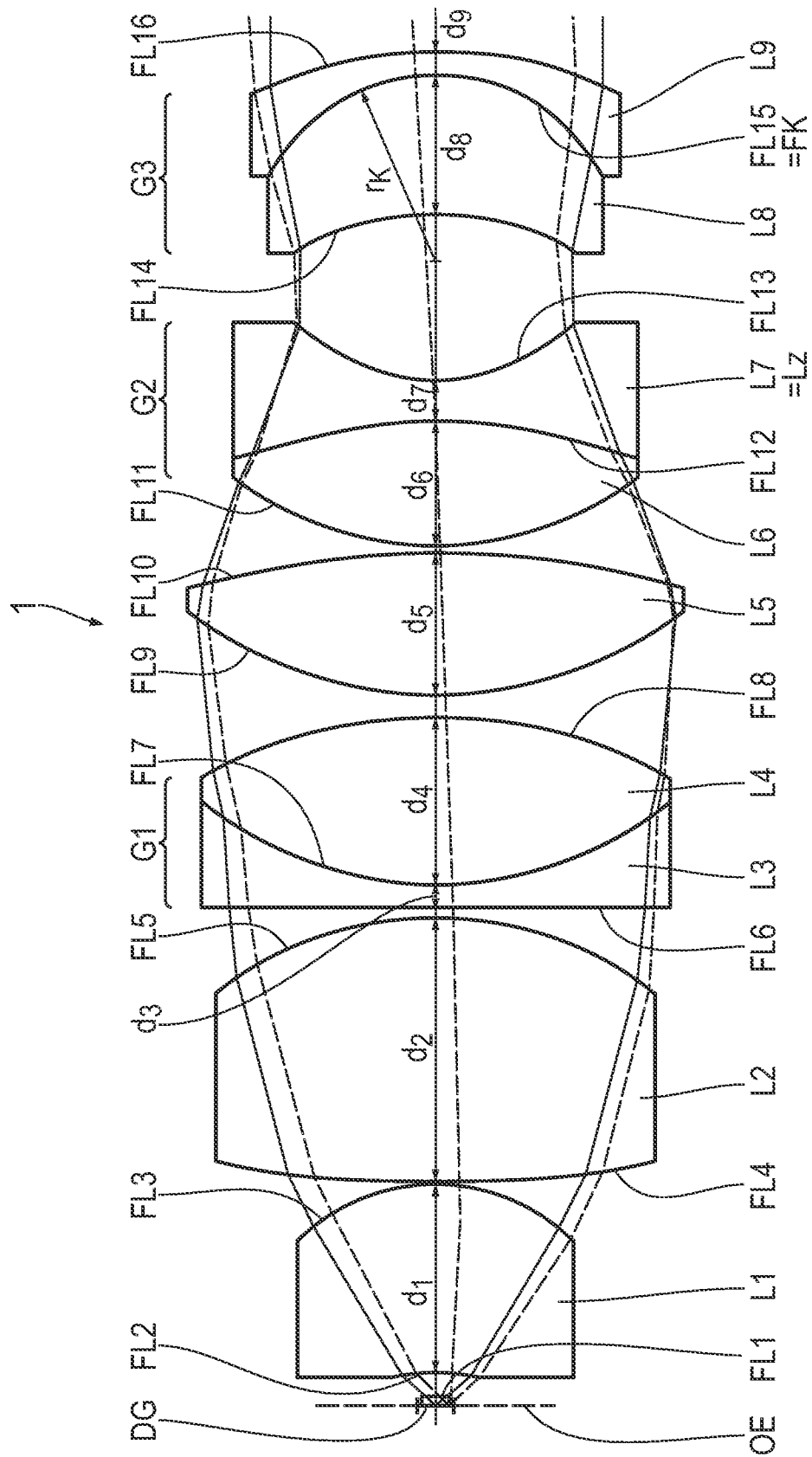
FIG. 1 shows a schematic longitudinal section through the optical components of a microscope objective according to a first variant.

FIG. 1 shows a longitudinal section through the arrangement of the optical constituent parts of an objective 1 for a microscope. Moreover, the figures represent the beam path in the objective for a central field point (full line) and for an off-centre point (dashed line) of the objective field, in each case in exemplary fashion To provide a better overview, mechanical constituent parts of the objective 1 are not illustrated in the figures.

A coverslip DG is represented in FIG. 1. It is arranged such that its front side lies in the region of an object plane OE.

The objective 1 has nine lenses Li; i=1 . . . 9.
The objective 1 has a numerical aperture NA of 0.75.
The objective 1 has a working distance AA of 1.17 mm.
The objective 1 has a focal length f'(Obj) of 10 mm.
The objective 1 is an apochromatic microscope objective. The apochromatic correction is obtained by way of three cemented doublets G1, G2, G3. A high refractive index converging lens L8 is used in the last cemented group G3. This yields a less curved surface in the direct beam waist of the objective 1.

The objective 1 has a high refractive index front lens L1. This was found to be expedient since the maximum aperture is present in the front region of the objective 1 and the beam heights have already grown accordingly as a result of the working distance AA≥1 mm. By using a high refractive index front lens it is possible to reduce the growth of especially the higher-order image aberrations.

Further, it was found to be advantageous to keep the thickness d2 of the second lens L2 to the order of the thickness d1 of the front lens L1. In particular, the following applies: 1.0≤d2/d1≤1.5, in particular d2/d1≤1.43.

The lenses L2, L4 and L5 are manufactured from the same type of glass. All remaining lenses are manufactured from pairwise different types of glass.

A single lens L5 is arranged between the first cemented group G1 and the second cemented group G2. The lens L5 is formed as a biconvex lens.

The last two cemented groups G2, G3 are arranged directly adjacent to one another. This should be understood to mean that no further lenses are arranged between the last two cemented groups G2, G3.

The last cemented group G3 in the beam path of the objective 1 has a cemented surface FL15 with a converging embodiment. It has a radius of curvature $r_{15}$ of −8.415 mm. This corresponds to −0.8415 times the focal length f of the objective 1.

The design data of the objective 1 as per FIG. 1 are listed in detail in Table 1.

TABLE 1

Design data of the objective as per FIG. 1

| | Area FL | | Radius of curvature r [mm] | Thickness d [mm] | Refractive index $n_e$ | Abbe number $v_e$ |
|---|---|---|---|---|---|---|
| | DG | OBJ | INF | 0.170 | 1.5256 | 54.3 |
| | | 1 | INF | 1.485 | | |
| | L1 | 2 | −6.492 | 8.180 | 1.8882 | 40.5 |
| | | 3 | −9.173 | 0.185 | | |
| | L2 | 4 | 53.084 | 11.629 | 1.4399 | 94.5 |
| | | 5 | −15.732 | 0.429 | | |
| G1 | L3 | 6 | INF | 1.010 | 1.6940 | 54.5 |
| | L4 | 7 | 15.962 | 7.462 | 1.4399 | 94.5 |
| | | 8 | −21.910 | 0.994 | | |
| | L5 | 9 | 18.171 | 6.325 | 1.4399 | 94.5 |
| | | 10 | −39.809 | 0.298 | | |
| G2 | L6 | 11 | 15.645 | 5.533 | 1.5945 | 68.0 |
| | L7 | 12 | −24.580 | 1.787 | 1.7434 | 32.1 |
| | | 13 | 8.913 | 7.313 | | |

TABLE 1-continued

Design data of the objective as per FIG. 1

| Area FL | | Radius of curvature r [mm] | Thickness d [mm] | Refractive index $n_e$ | Abbe number $v_e$ |
|---|---|---|---|---|---|
| G3 | L8 | 14 | −13.143 | 6.339 | 1.7686 | 26.3 |
| | L9 | 15 | −8.415 | 1.010 | 1.6968 | 50.5 |
| | | 16 | −19.670 | | | |

The objective 1 as per FIG. 1 serves for use with a tube system, the design data of which are summarized in Table 2.

TABLE 2

Design data of a tube system for use with the objective as per FIG. 1:

| Area FL | Radius of curvature r [mm] | Thickness d [mm] | Refractive index $n_e$ | Abbe number $v_e$ |
|---|---|---|---|---|
| | | 130.00 | | |
| 1 | 760.00 | 2.00 | 1.6522 | 33.6 |
| 2 | 186.75 | 5.00 | 1.5187 | 64.0 |
| 3 | −219.80 | 399.10 | | |
| Image | | | | |

The tube system is an achromat with a focal length of 400 nm.

Figure 2:
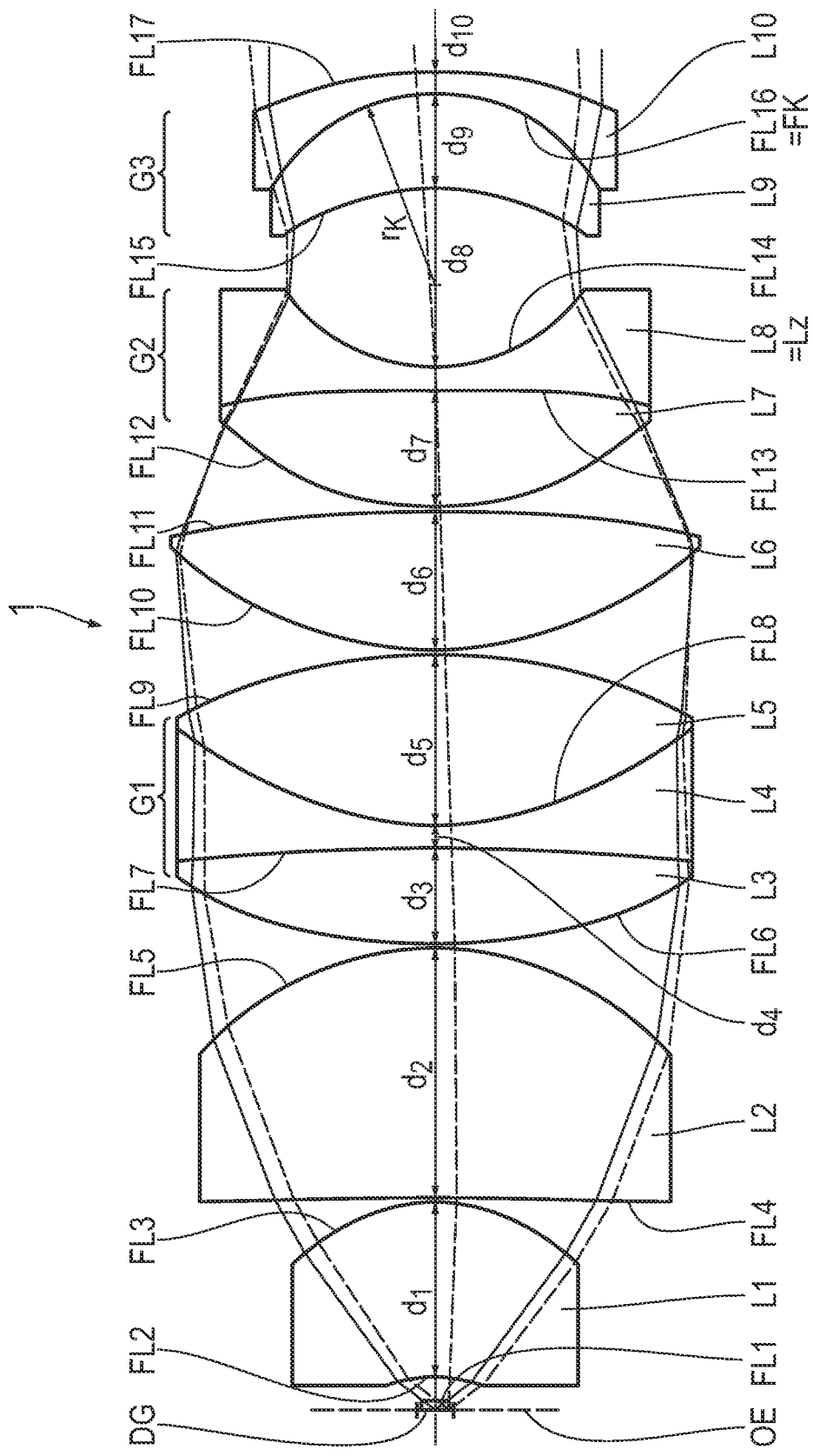
FIG. 2 shows a schematic longitudinal section through the optical components of a microscope objective according to a second variant and FIG. 3 shows a schematic longitudinal section through the optical components of a microscope objective according to a third variant.

FIG. 2 represents a different variant of the objective 1. To obtain a better colour correction in a wavelength range from 405 nm to 950 nm, the first cemented doublet of the objective as per FIG. 1 was replaced with a cemented triplet G1.

Moreover, the objective 1 as per FIG. 2 is provided for use with an alternative tube lens system, the optical data of which are summarized in Table 4. This results in an alternative choice of glass.

Apart from the third lens L3 and the fifth lens L5, which are produced from the same type of glass, all lenses are produced from pairwise different types of glass.

The optical design data of the objective 1 as per FIG. 2 are summarized in Table 3.

TABLE 3

Design data of the objective as per FIG. 2

| | Area FL | | Radius of curvature r [mm] | Thickness d [mm] | Refractive index $n_e$ | Abbe number $v_e$ |
|---|---|---|---|---|---|---|
| | DG | 1 | INF | 0.170 | 1.525 | 54.3 |
| | | 2 | INF | 1.526 | | |
| | L1 | 3 | −6.281 | 8.200 | 1.839 | 42.5 |
| | | 4 | −9.164 | 0.200 | | |
| | L2 | 5 | −152.41 | 11.636 | 1.460 | 89.5 |
| | | 6 | −14.747 | 0.200 | | |
| G1 | L3 | 7 | 25.682 | 4.623 | 1.435 | 94.8 |
| | L4 | 8 | −94.176 | 1.000 | 1.792 | 47.2 |
| | L5 | 9 | 17.904 | 8.079 | 1.435 | 94.8 |
| | | 10 | −24.881 | 0.150 | | |
| | L6 | 11 | 18.240 | 6.460 | 1.439 | 94.5 |
| | | 12 | −71.215 | 0.150 | | |
| G2 | L7 | 13 | 13.7545 | 5.565 | 1.487 | 84.1 |
| | L8 | 14 | −86.078 | 1.100 | 1.658 | 39.5 |
| | | 15 | 8.616 | 8.500 | | |
| | L9 | 16 | −12.460 | 4.500 | 1.795 | 28.2 |
| G3 | L10 | 17 | −8.641 | 1.000 | 1.737 | 51.2 |
| | | 18 | −18.357 | | | |

The objective 1 as per FIG. 2 has ten lenses L1 to L10.
The objective 1 as per FIG. 2 has a numerical aperture NA of 0.8.
The objective 1 as per FIG. 2 has a working distance AA of 1.13 mm.
The objective 1 as per FIG. 2 has a focal length f of 9.75 mm.

Table 4 summarizes the optical design data of the tube lens system provided for use with the objective 1 as per FIG. 2.

TABLE 4

Design data of a tube system for use with the objective as per FIG. 2

| Area FL | Radius of curvature r | Thickness d | Refractive index $n_e$ | Abbe number $v_e$ |
|---|---|---|---|---|
| | | 155.00 | | |
| 1 | 175.30 | 7.40 | 1.4891 | 70.2 |
| 2 | −70.29 | 2.60 | 1.6580 | 39.5 |
| 3 | −137.69 | 5.00 | | |
| 4 | INF | 45.00 | 1.5187 | 64.0 |
| 5 | INF | 157.34 | | |
| Image | | | | |

The tube lens system as per Table 4 has a focal length of 195 mm.

Figure 3:
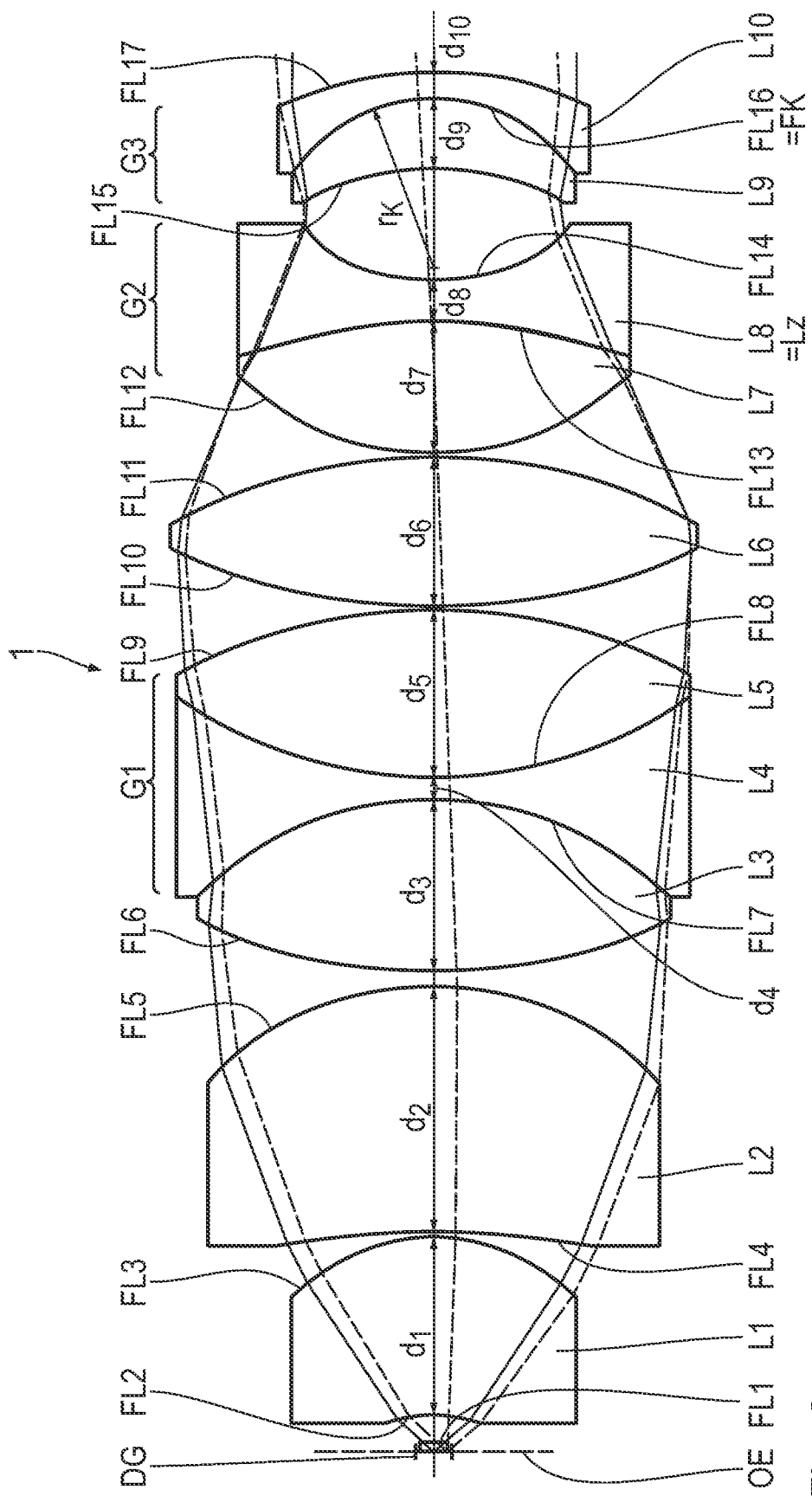

FIG. 3 represents a further variant of an objective 1. The objective 1 as per FIG. 3 was designed for use with a tube lens system designed more for compensation. The arrangement of the converging cemented surface in the last cemented group G3, which acts in relation to removing higher-order image aberrations, can also be applied here.

The optical design data of the objective 1 as per FIG. 3 are summarized in Table 5.

TABLE 5

Design data of the objective as per FIG. 3

| | Area FL | | Radius of curvature r [mm] | Thickness d [mm] | Refractive index $n_e$ | Abbe number $v_e$ |
|---|---|---|---|---|---|---|
| | DG | 1 | INF | 0.17 | 1.5256 | 54.3 |
| | | 2 | INF | 1.507 | | |
| | L1 | 3 | −6.531 | 8.200 | 1.8881 | 40.5 |
| | | 4 | −9.018 | 0.200 | | |
| | L2 | 5 | −40.568 | 11.216 | 1.6229 | 60.1 |
| | | 6 | −14.516 | 0.562 | | |
| G1 | L3 | 7 | 25.669 | 7.962 | 1.4350 | 94.8 |
| | L4 | 8 | −15.338 | 1.000 | 1.7762 | 49.4 |
| | L4 | 9 | 20.909 | 7.700 | 1.5710 | 70.9 |
| | | 10 | −24.981 | 0.150 | | |
| | L6 | 11 | 29.714 | 6.800 | 1.4399 | 94.5 |
| | | 12 | −25.270 | 0.150 | | |
| G2 | L7 | 13 | 12.970 | 6.151 | 1.4399 | 94.2 |
| | L8 | 14 | −25.872 | 1.805 | 1.6580 | 39.5 |
| | | 15 | 8.566 | 5.134 | | |
| G3 | L9 | 16 | −12.185 | 3.353 | 1.7954 | 28.2 |
| | L10 | 17 | −7.542 | 1.000 | 1.7469 | 49.2 |
| | | 18 | −19.035 | 0.500 | | |

The objective 1 as per FIG. 3 has ten lenses L1 to L10.
The objective 1 as per FIG. 3 has a numerical aperture NA of 0.8.
The objective 1 as per FIG. 3 has a working distance AA of 1.2 mm.
The objective 1 as per FIG. 3 has a focal length f of 8.25 mm.

The optical design data of the tube system, on which the design of the objective 1 as per FIG. 3 was based, are summarized in Table 6.

TABLE 6

Design data of a tube system for
use with the objective as per FIG. 3

| Area FL | Radius of curvature r [mm] | Thickness d [mm] | Refractive index $n_e$ | Abbe number $v_e$ |
|---|---|---|---|---|
|   |   | 132.00 |   |   |
| 1 | 233.816 | 4.00 | 1.723 | 29.3 |
| 2 | 28.386 | 12.00 | 1.716 | 53.6 |
| 3 | 209.659 | 10.69 |   |   |
| 4 | 131.464 | 13.00 | 1.624 | 36.1 |
| 5 | −27.189 | 4.00 | 1.623 | 60.1 |
| 6 | −328.015 | 55.18 |   |   |
| 7 | INF | 80.00 | 1.519 | 64.0 |
| 8 | INF | 48.20 |   |   |
| Image |   |   |   |   |

The tube system as per Table 6 has a focal length of 165 mm.

The above-described objectives are used in a microscope, in particular with the tube systems provided therefor. The microscope can serve to image large object fields in particular. In particular, $3.5° < R_{Obj}/f_{Obj} < 5°$ can apply, where $R_{Obj}$ denotes the object field radius.

The invention claimed is:

1. A microscope objective having a focal length, the microscope objective comprising:
    a first lens comprising a material having a refractive index of at least 1.7 at a wavelength of 546 nanometers;
    a second lens adjacent to the first lens; and
    a cemented group comprising a converging cemented surface comprising a cemented radius of from 0.75 times the focal length of the microscope objective to 0.95 times the focal length of the microscope objective,
    wherein:
        the first lens is in front of the second lens along a beam path through the microscope objective;
        a thickness of the second lens is at least as great as a thickness of the first lens; and
        the microscope objective is an apochromatic microscope objective.

2. The microscope objective of claim 1, wherein the microscope objective comprises three cemented groups.

3. The microscope objective of claim 2, wherein the cemented group comprising the converging cemented surface comprising the cemented radius of from 0.75 times the focal length of the microscope objective to 0.95 times the focal length of the microscope objective is a last cemented group along the beam path through the microscope objective.

4. The microscope objective of claim 1, wherein the microscope objective comprises three cemented groups, and a penultimate cemented group along the beam path through the microscope objective comprises a diverging lens.

5. The microscope objective of claim 4, wherein the cemented group comprising the converging cemented surface comprising the cemented radius of from 0.75 times the focal length of the microscope objective to 0.95 times the focal length of the microscope objective is a last cemented group along the beam path through the microscope objective.

6. The microscope objective of claim 1, wherein the microscope objective comprises a cemented triplet.

7. The microscope objective of claim 1, wherein the first lens is a second thickest lens of the microscope objective.

8. The microscope objective of claim 1, wherein a total number of lenses in the microscope objective is at least 10.

9. The microscope objective of claim 1, wherein the microscope objective comprises a plurality of cemented groups, and the microscope objective comprises a single lens between two of the cemented groups.

10. The microscope objective of claim 9, wherein no further lenses are between the two of the cemented groups.

11. The microscope objective of claim 1, wherein the microscope objective comprises two cemented groups, and at least one of the cemented groups comprises surfaces facing each other for which an absolute value of a radius of curvature of one of the cemented groups is greater than an absolute value of a radius of curvature of the other cemented group.

12. The microscope objective of claim 1, wherein the microscope objective has a numerical aperture of at least 0.7.

13. The microscope objective of claim 1, wherein the microscope objective has a working distance of at least 1 mm.

14. The microscope objective of claim 1, wherein the microscope objective is configured so that, during use, off-axis object points generate a rotationally symmetric point image.

15. The microscope objective of claim 1, wherein the microscope objective comprises a cemented triplet, and the first lens is a second thickest lens of the microscope objective.

16. The microscope objective of claim 15, wherein a total number of lenses in the microscope objective is at least 10.

17. A microscope, comprising:
    a microscope objective according to claim 1.

18. A microscope objective having a focal length, the microscope objective comprising:
    a first lens comprising a high refractive index material;
    a second lens adjacent to the first lens; and
    a cemented group comprising a converging cemented surface comprising a cemented radius of from 0.75 times the focal length of the microscope objective to 0.95 times the focal length of the microscope objective,
    wherein:
        the first lens is in front of the second lens along a beam path through the microscope objective;
        the first lens is a second thickest lens of the microscope objective;
        a thickness of the second lens is at least as great as a thickness of the first lens; and
        the microscope objective is an apochromatic microscope objective.

19. A microscope, comprising:
    a microscope objective according to claim 18.

20. A microscope objective having a focal length, the microscope objective comprising:
    a first lens comprising a high refractive index material;
    a second lens adjacent to the first lens; and
    three cemented groups comprising a last cemented group along a beam path through the microscope objective, the last cemented group comprising a converging cemented surface comprising a cemented radius of from 0.75 times the focal length of the microscope objective to 0.95 times the focal length of the microscope objective,
    wherein:
        the first lens is in front of the second lens along the beam path through the microscope objective;
        a thickness of the second lens is at least as great as a thickness of the front lens;

the microscope objective is an apochromatic microscope objective.

21. A microscope, comprising:
a microscope objective according to claim 20.

* * * * *

UNITED STATES PATENT AND TRADEMARK OFFICE
CERTIFICATE OF CORRECTION

PATENT NO. : 12,174,359 B2
APPLICATION NO. : 17/550567
DATED : December 24, 2024
INVENTOR(S) : Jörg Sprenger It is certified that error appears in the above-identified patent and that said Letters Patent is hereby corrected as shown below:

On the Title Page

Column 2, Item (56), Line 1, delete "729,391" insert -- 5,729,391 --.

Column 2, Item (56), Line 2, delete "978,147" insert -- 5,978,147 --.

In the Specification

Column 1, Line 10, after "entirety" insert -- . --.

Column 1, Line 45, delete "$(n_2 - n_1)/rK > 0$," insert -- $(n_2 - n_1)/r_K > 0$, --.

Column 3, Line 35, after "$R_{Obj}$: $R_{Obj}/f_{Obj} \leq 3°$" insert -- . --.

Column 3, Line 61, delete "variant and" insert -- variant. --.

Column 4, Line 3, after "fashion" insert -- . --.

Signed and Sealed this
Eighteenth Day of March, 2025

Coke Morgan Stewart
*Acting Director of the United States Patent and Trademark Office*